(12) United States Patent
Banning et al.

(10) Patent No.: US 7,249,246 B1
(45) Date of Patent: Jul. 24, 2007

(54) METHODS AND SYSTEMS FOR MAINTAINING INFORMATION FOR LOCATING NON-NATIVE PROCESSOR INSTRUCTIONS WHEN EXECUTING NATIVE PROCESSOR INSTRUCTIONS

(75) Inventors: John P. Banning, Sunnyvale, CA (US); H. Peter Anvin, San Jose, CA (US); Guillermo J. Rozas, Los Gatos, CA (US)

(73) Assignee: Transmeta Corporation, Santa Clara, CA (US)

( * ) Notice: Subject to any disclaimer, the term of this patent is extended or adjusted under 35 U.S.C. 154(b) by 499 days.

(21) Appl. No.: 10/600,989

(22) Filed: Jun. 20, 2003

(51) Int. Cl.
*G06F 9/42* (2006.01)
(52) U.S. Cl. .................... 712/227; 712/228
(58) Field of Classification Search ............... 712/228, 712/227
See application file for complete search history.

(56) References Cited

U.S. PATENT DOCUMENTS

| | | | | |
|---|---|---|---|---|
| 4,920,477 A | * | 4/1990 | Colwell et al. | 711/207 |
| 5,057,837 A | * | 10/1991 | Colwell et al. | 341/55 |
| 6,044,475 A | * | 3/2000 | Chung et al. | 714/15 |
| 6,195,676 B1 | * | 2/2001 | Spix et al. | 718/107 |
| 6,397,379 B1 | * | 5/2002 | Yates et al. | 717/140 |
| 6,401,216 B1 | * | 6/2002 | Meth et al. | 714/16 |

* cited by examiner

*Primary Examiner*—Fritz Fleming
*Assistant Examiner*—Vincent Lai

(57) ABSTRACT

Methods and systems that allow recovery of the program counter or instruction pointer for a target (non-native) instruction that is translated into a host (native) instruction, and that allow recovery of other information about the translator or the target system state, are described. The program counter or instruction pointer can be recovered, for example, after an exception has been processed or incident to a rollback operation.

22 Claims, 11 Drawing Sheets

600

```
ACCESS A TRANSLATION OF NON-NATIVE INSTRUCTIONS
TO A CODE SEQUENCE OF NATIVE INSTRUCTIONS
610
```

↓

```
PERFORM A ROLLBACK OPERATION TO RETURN TO A
COMMIT POINT USING A FIRST ADDRESS TO LOCATE A
NATIVE INSTRUCTION ASSOCIATED WITH THE COMMIT
POINT
620
```

↓

```
IN CONJUNCTION WITH THE ROLLBACK, USE A SECOND
ADDRESS TO IDENTIFY A LOCATION FOR A NON-NATIVE
INSTRUCTION ASSOCIATED WITH THE COMMIT POINT
630
```

FIGURE 6

METHODS AND SYSTEMS FOR MAINTAINING INFORMATION FOR LOCATING NON-NATIVE PROCESSOR INSTRUCTIONS WHEN EXECUTING NATIVE PROCESSOR INSTRUCTIONS

BACKGROUND OF THE INVENTION

1. Field of the Invention

Embodiments of the present invention relate to processors and microprocessors. More specifically, embodiments of the present invention relate to registers used by processors and microprocessors.

2. Related Art

Innovations in processor design have yielded processors (or microprocessors) that consume less power and operate at cooler temperatures in comparison to other types of processors (or microprocessors). These improved processors accomplish this in part by transferring some processor functions to software. More specifically, processor functions keyed to determining what instructions (micro-instructions) to execute, and when, are transferred to software in a process that may be referred to as "code morphing™" or "translation." Using code morphing™ or translation software "non-native" instructions (e.g., conventional x86 or 80x86 instructions) are translated into "native" instruction sets that can be used by the improved processors. Non-native instructions are also referred to as target instructions, and native instructions are also referred to as host instructions. Translated instructions are demarcated by "commit points," which are points in the translation where a host processor state and a target processor state would be consistently represented in the host processor.

In a code morphing™ or translation-based system, the program counter (PC) or instruction pointer (IP) of the target instruction is not maintained explicitly. In some implementations, the program counter value associated with a commit point (referred to herein as the "at-commit" or "after-commit" program counter, or ACPC) is stored in a register. The ACPC can sometimes be used to reconstruct the PC or IP of the target instruction.

However, there are instances in which there is a mapping of multiple PCs or IPs to a single ACPC value. In these instances, the ACPC cannot be used to reconstruct a particular PC or IP. Accordingly, a method and/or system that can be used to recover the PC or IP of a target instruction would be of value.

SUMMARY OF THE INVENTION

Embodiments of the present invention provide methods and systems that allow recovery of the program counter or instruction pointer for a target (non-native) instruction that is translated into a host (native) instruction and that allow recovery of other information about the translator or the target system state. According to the embodiment of the present invention, the program counter, instruction pointer, or other information about the target state or host instructions can be recovered, for example, after an exception has been processed or incident to a rollback operation.

BRIEF DESCRIPTION OF THE DRAWINGS

The accompanying drawings, which are incorporated in and form a part of this specification, illustrate embodiments of the invention and, together with the description, serve to explain the principles of these embodiments.

FIG. 6 is a flowchart of a process for recovering the PC or IP for a target (non-native) instruction, according to one embodiment of the present invention.

DETAILED DESCRIPTION OF THE INVENTION

Figure 1A:
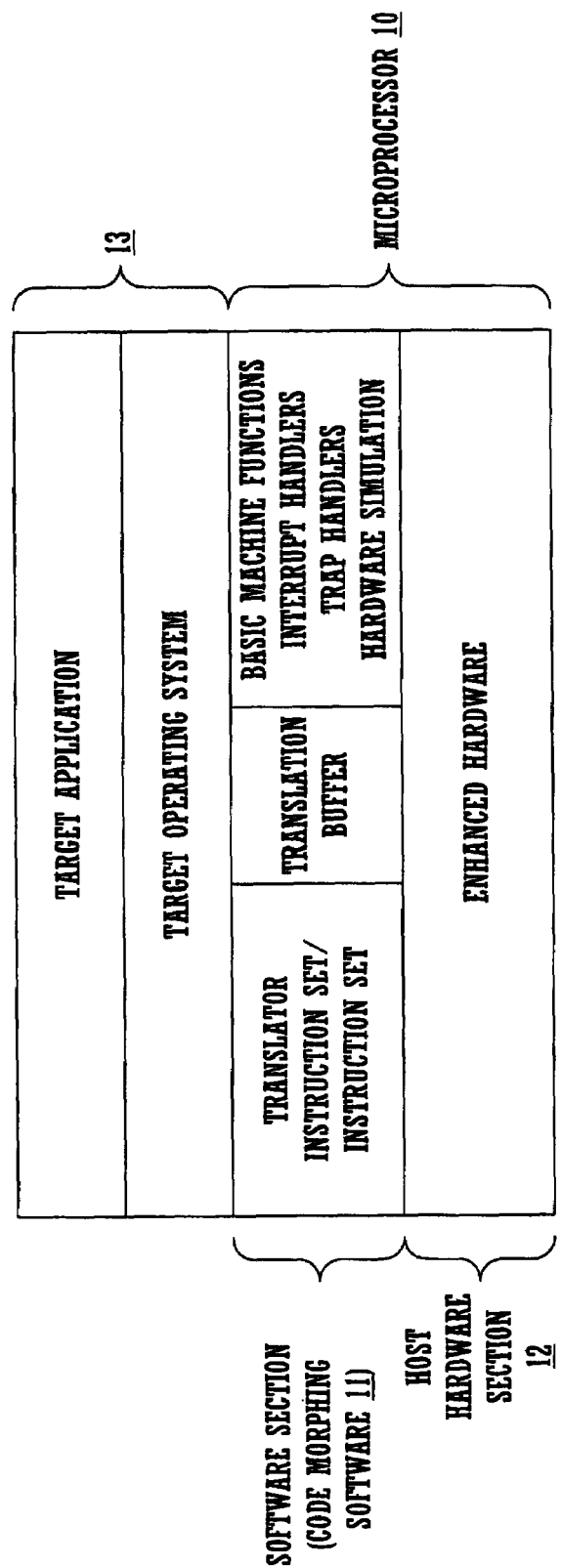
FIG. 1A is a block diagram of one embodiment of a processor upon which embodiments of the present invention may be implemented.

Reference will now be made in detail to the various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "translating," "advancing," "rolling back," "identifying," "executing," "setting," "performing," "identifying," "registering," "establishing," "providing," "accessing," "handling," "taking," "placing," "reading," "returning" or the like, refer to the action and processes (e.g., flowcharts 500, 600 and 700 of FIGS. 5, 6 and 7, respectively) of a computer system or similar intelligent electronic computing device, that manipulates and transforms data represented as physical (electronic) quantities within the computer system's registers and memories into other data similarly represented as physical quantities within the computer system memories or registers or other such information storage, transmission or display devices.

Aspects of the present invention may be practiced on a computer system that includes, in general, a central processing unit (CPU) for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor. The computer system may also include an input/output device for providing a physical communication link between the computer system and a network, using either a wired or a wireless communication interface.

FIG. 1A is a block diagram of one embodiment of a processor (microprocessor) 10 upon which embodiments of the present invention can be implemented. In the present embodiment, processor 10 includes translation (code morphing™) software 11 and host hardware 12. The code morphing™ software 11 is for translating non-native instructions (e.g., x86 instructions) into native instructions for host hardware 12. In one embodiment, code morphing™ software 11 dynamically translates x86 instructions into Very Long Instruction Word (VLIW) instructions that can reduce the number of instructions executed and that can schedule the instructions to execute more efficiently within the processor. A VLIW can also be referred to as a "molecule." A molecule includes a number of component instructions that can be referred to as "atoms."

In the present embodiment, the target (non-native) application furnishes the target (non-native) instructions (referred to together in FIG. 1A as element 13) to the code morphing™ software 11 for translation into host (native) instructions that the host hardware 12 is capable of executing. In the meantime, the target operating system receives calls from the target application program and transfers these to the code morphing™ software 11. In the present embodiment, the translation buffer 14 is used to store the host (native) instructions that embody each completed translation of the target (non-native) instructions.

One embodiment of a processor 10, which includes the code morphing™ software 11 and the host hardware 12 described above, is described further by U.S. Pat. No. 6,031,992, "Combining Hardware and Software to Provide an Improved Microprocessor," by Robert F. Cmelik et al., dated Feb. 29, 2000, assigned to the assignee of the present invention, and hereby incorporated by reference in its entirety.

Figure 1B:
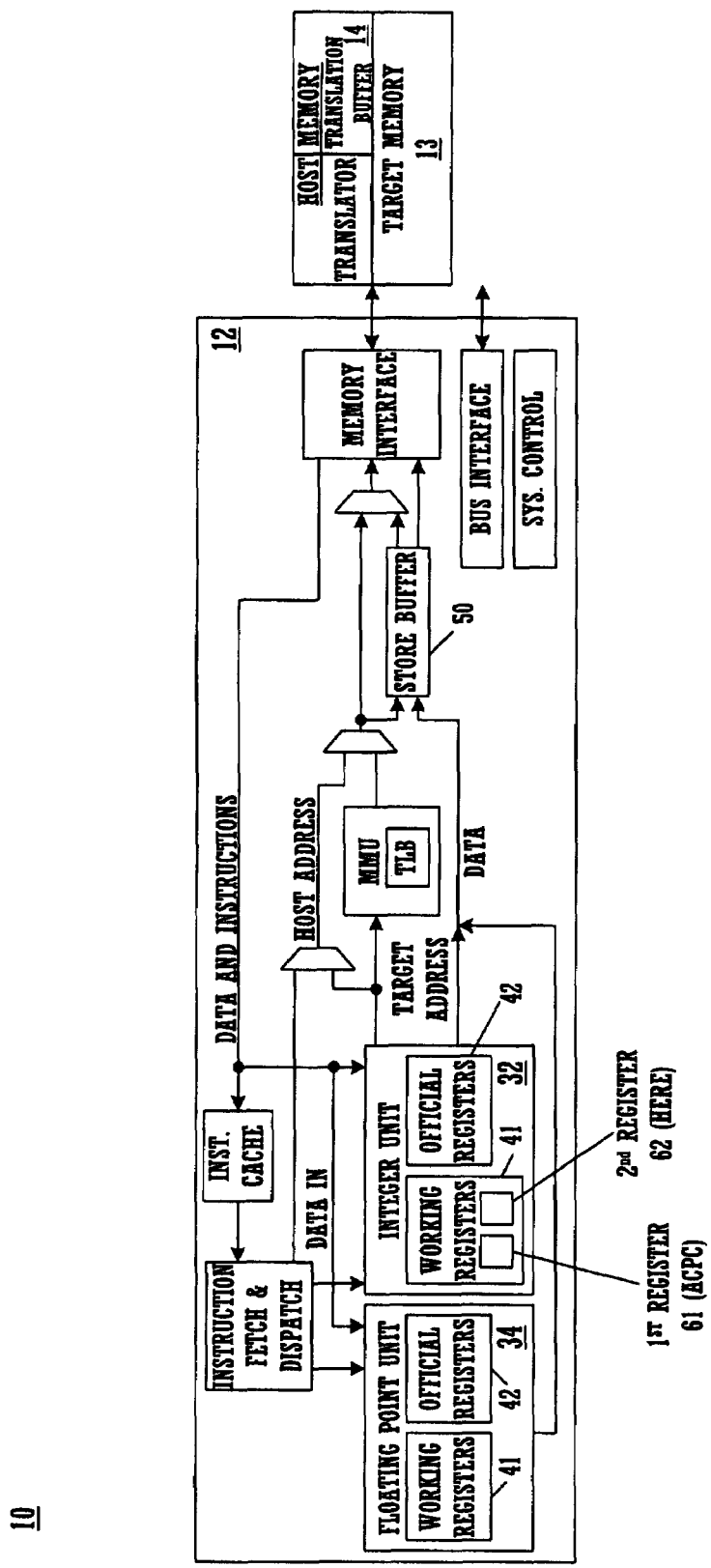
FIG. 1B is a block diagram showing some details of the processor of FIG. 1A according to one embodiment of the present invention.

Referring now to FIG. 1B, a set of official (e.g., architecturally visible) target registers 42 is provided by the host hardware 12 to hold the state of the registers of a target processor for which an application was designed. The registers 42 can be included in each of the floating point units 34, any integer units 32, and any other execution units.

According to the present embodiment, the registers 41 and 42 allow for the maintenance of a set of host or working registers (41) for processing the host (native) instructions, and a set of target (or shadow) registers (42) to hold the official state of the target processor for which a target application was created. The target (or shadow) registers 42 are coupled to their working register 41 equivalents through an interface that allows an operation that may be referred to as "commit" to quickly transfer the content of all working registers 41 to target registers 42, and allows an operation that may be referred to as "rollback" to quickly transfer the content of all target registers 42 back to their working register 41 equivalents (e.g., to restore their values to a prior state).

As used herein, a "translation" refers to a sequence of native instructions that perform the same function as some set of non-native instructions. When a translation has been executed by host hardware 12 without error or without otherwise being interrupted, then the information in the store buffer 50 generated during the execution is moved together past the gate of the store buffer 50 (e.g., it is committed) and subsequently written to translation buffer 14. This marks an architecturally precise point in execution, where the state of these registers is the same with respect to the native and non-native application programs. The register state is then "architecturally visible" (e.g., it can be viewed outside the processor).

According to one embodiment of the present invention, the working registers 41 of the integer unit 32 include a first register 61 and a second register 62. Although the registers 61 and 62 are described as residing in the working registers 41 of the integer unit 32, it is appreciated that these registers can reside elsewhere in host hardware 12. In general, the size and format of these registers is compatible with the size and format of the program counter. In one embodiment, the registers 61 and 62 are for holding 32-bit memory addresses.

First register 61 is for holding the "at-commit" or "after-commit" program counter (ACPC) value, and as such it may be referred to as the ACPC register. Second register 62 is for holding a program counter value that, either directly or indirectly, allows the program counter (PC) or instruction pointer (IP) for a particular target (non-native) instruction to be recovered. More particularly, second register 62 allows for recovery of the non-native instruction associated with a committed state. For simplicity and clarity of discussion, second register 62 may be referred to as the Here register.

The ACPC register 61 and the Here register 62 can be distinguished from each other at least by their respective functions. For example, the ACPC register 61 points where to resume execution after a rollback, in other words the last place at which a commit operation was performed. The ACPC register 61 points to an address of a native instruction. The Here register 62 points to a native code point from which the PC, IP or other information about a translation can be recovered from, or where "rollback compensation" is performed (rollback compensation is described further below). These and other features and functions of the ACPC and Here registers will become fully evident in the discussions to follow.

Figure 2A:
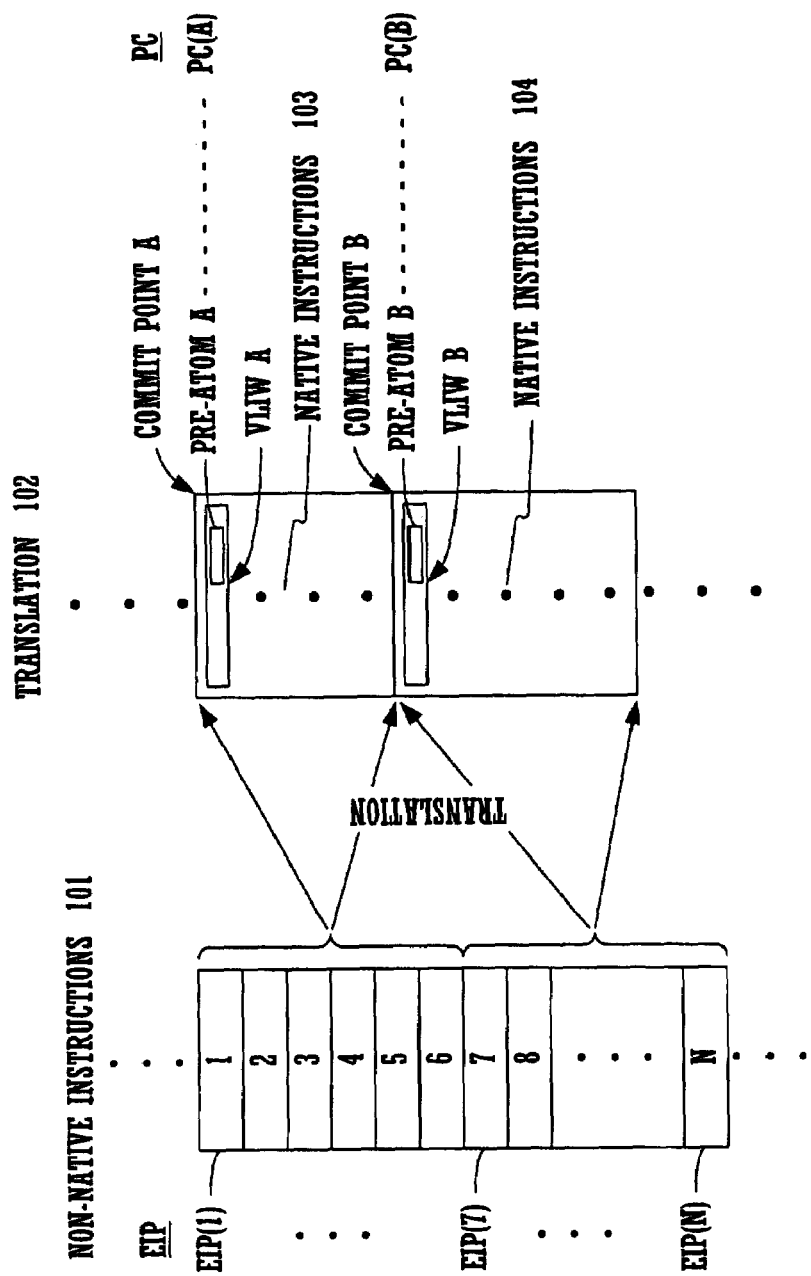
FIG. 2A illustrates an example of a translation of non-native instructions into native instructions according to one embodiment of the present invention.

FIG. 2A illustrates an example of a translation 102 of non-native instructions 101 into native instructions 103 and 104 according to one embodiment of the present invention. In the example of FIG. 2A, the non-native instructions 101 (e.g., target code) include a code sequence of N instructions. Associated with each of the non-native instructions is an IP or PC. The term "effective instruction pointer" (EIP) is used herein to refer to an IP, PC or the like. Generally speaking, the EIP refers to a pointer that indicates a non-native instruction that is about to be executed. In the example of FIG. 2A, the EIPs are shown over time. EIP(1) points to non-native instruction 1, EIP(7) points to non-native instruction 7, EIP(N) points to non-native instruction N, and so on.

In the example of FIG. 2A, the code sequence of non-native instructions 1–6 are translated into the code sequence of native instructions 103, and the code sequence of non-native instructions 7–N are translated into the code sequence of native instructions 104. The code sequence of native instructions 103 are demarcated by a first commit point A, and the code sequence of native instructions 104 are demarcated by a second commit point B. Significantly, the commit points in translation 102 precede the instruction(s) to be executed. Also of significance, translation 102 includes multiple commit points. Although two commit points are illustrated, translation 102 can include some number of commit points other than two.

As noted above, a VLIW or molecule is comprised of a number of instructions referred to as atoms. The present invention introduces a particular type of atom that is referred to herein as a "pre-atom" in order to distinguish it from other atoms. Of particular interest are the contents of a pre-atom that is in the first VLIW following a commit point.

In the example of FIG. 2A, VLIW A is the first molecule following commit point A, and VLIW B is the first molecule following commit point B. VLIW A includes a pre-atom A, and VLIW B includes a pre-atom B. VLIW A, and hence pre-atom A, is indicated by a program counter value PC(A). VLIW B, and hence pre-atom B, is indicated by a program counter value PC(B).

Figure 2B:
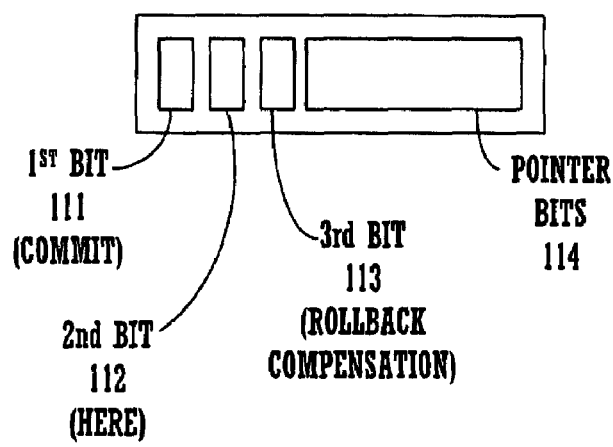
FIG. 2B illustrates the general format of a native instruction used for recovering the program counter (PC) or instruction pointer (IP) for a target (non-native) instruction, according to one embodiment of the present invention.

FIG. 2B illustrates the general format of a pre-atom 110 according to one embodiment of the present invention. In this embodiment, pre-atom 110 includes a first bit 111, a second bit 112, a third bit 113, and a number of pointer bits 114. It is appreciated that a pre-atom can include other information not shown, such as opcode and other control bits.

The first bit 111 may also be referred to as the commit bit, the second bit 112 may also be referred to as the Here bit, and the third bit 113 may also be referred to as the EIP versus rollback compensation bit. The values of the various bits in pre-atom 110 are under control of the translation or code morphing™ software 11 (FIGS. 1A and 1B).

With reference to FIG. 2B, depending on the value of the first bit 111, a commit operation is performed. That is, for example, should the first bit 111 be set to a value of one (1), then a commit operation is performed at this native instruction (VLIW) associated with the pre-atom. If a commit operation is performed, then the program counter value associated with the VLIW (native instruction) that contains the pre-atom 110 is loaded into the ACPC register 61 (FIG. 1B).

Continuing with reference to FIG. 2B, depending on the value of the second bit 112, a program counter value is loaded into the Here register 62 (FIG. 1B). For example, should the second bit 112 have a value of 1, then the program counter value associated with the VLIW (native instruction) that contains the pre-atom 110 is loaded into the Here register 62.

Third bit 113 of FIG. 2B is for indicating whether or not rollback compensation is associated with the pre-atom 110. Generally speaking, rollback compensation refers to actions that are performed to return the processor 10 to a state at which the translation can be properly restarted. For example, while executing a translation after a commit point, an exception may be taken. After servicing the exception, in order to restart the translation, rollback compensation is implemented to return the translation to a proper entry point in the translation (e.g., to a commit point, or to set up variables for use in the translation). Rollback compensation is further described in conjunction with the examples of FIGS. 3A–3C and 4A–4C, below.

With reference back to FIG. 2B, the pointer bits 114 provide a mapping to the EIP for the non-native instruction to be recovered. For simplicity of discussion, that EIP will be referred to as the "EIP of interest." Pointer bits 114 either point to a place in memory that holds the EIP of interest, or they point to another software construction that in turn leads to the EIP of interest. The term "point to" is used generally; as used herein, to "point" means to point to something directly, or to point to something indirectly via another software construction, with a target address or with an offset relative to the pre-atom. For example, the other software construction can be another pre-atom that has a pointer to the EIP of interest. Alternatively, the other software construction can be a subroutine that performs certain actions that include either pointing to the EIP of interest, resetting the EIP to the EIP of interest, or fixing the target processor state.

The value of the third bit 113 in essence provides an indication of where the pointer bits 114 point. For example, if the third bit 113 is set to a value of 1, as described above, then rollback compensation is implemented and pointer bits 114 will point to either another pre-atom or to a subroutine, depending on the type of rollback compensation being implemented. If the third bit 113 is not set, then rollback compensation is not implemented and pointer bits 114 will point to a location where the EIP can be recovered. This is also described in conjunction with the examples of FIGS. 3A–3C and 4A–4C. Note that the pointer bits 114 can also point to other information. For example, the pointer bits 114 can point to data structures that allow a translation to be modified or replaced in response to certain kinds of events.

Figure 2C:
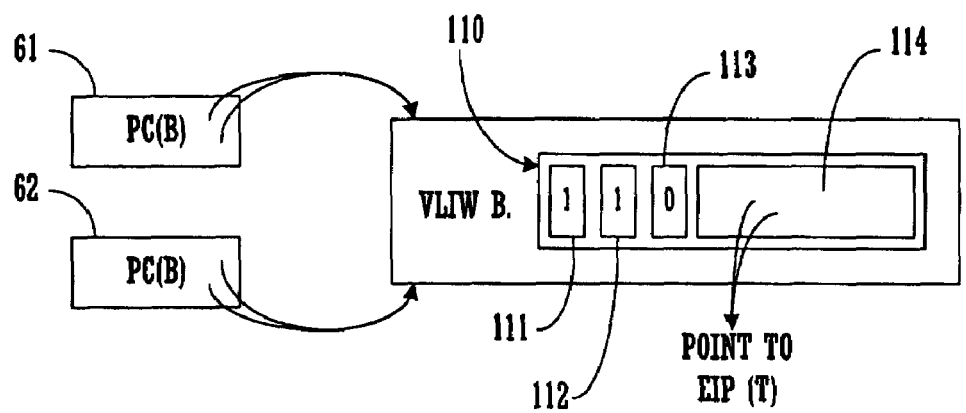
FIG. 2C illustrates the contents of the instruction of FIG. 2B for the example of FIG. 2A, according to one embodiment of the present invention.

FIG. 2C illustrates the contents of a pre-atom 110 for the example translation of FIG. 2A, according to one embodiment of the present invention. It is appreciated that pre-atom 110 can include other information not shown. In this example, pre-atom 110 is one of the atom instructions in VLIW B, which is the first instruction following commit point B (e.g., it is the instruction that causes the commit). First bit 111 is set to 1, indicating that a commit operation is to be performed; this commit operation commits the state associated with native instructions 103 at commit point B. In addition, PC(B) is written to ACPC register 61; therefore, ACPC register 61 points to VLIW B (and by extension, to pre-atom 110). Second bit 112 is set to 1, indicating that PC(B) is also to be written to Here register 62; therefore, Here register 62 points to VLIW B (and by extension, to pre-atom 110). Third bit 113 is not set, thereby indicating that rollback compensation is not implemented. Accordingly, pointer bits 114 point to the EIP of interest. In the example of FIG. 2A, the EIP of interest is EIP(7), corresponding to the first non-native instruction (instruction 7) associated with the code sequence of native instructions 104. Note that instruction 7 can be said to be associated with commit point B, in the sense that the target processor state at EIP(7) and the host processor state at commit point B are consistent (architecturally precise). In this case, EIP(7) can also be determined from ACPC register 61.

Note that, in the example of FIG. 2A, commit point A occurs in time before commit point B. In pre-atom A, the first and second bits 111 and 112 would be set, but the third bit 113 would not be set and the pointer bits 114 would point to EIP(1). After executing pre-atom A, the ACPC register 61 would hold PC(A), but then would be overwritten with PC(B) when pre-atom B is executed. Similarly, Here register 62 would first hold PC(A), and then would be overwritten with PC(B).

In the example of FIG. 2A, the ACPC register 61 and the Here register 62 each hold the same information. However, as will be seen, there are instances in which the first bit 111 is set, but the second bit 112 is not set. In those instances, the ACPC register 61 and the Here register 62 would hold different information. This is discussed further in conjunction with the example of FIGS. 4A–4C, below.

The example of FIG. 2A is now used to describe the present embodiment of the present invention in practice. Consider a scenario in which there is an event, such as an exception, that triggers a rollback operation during the execution of a translation of non-native instructions 7–N to native instructions 104. The rollback operation is intended to return the translation to an architecturally precise point from which the translation can be properly restarted; in the example of FIG. 2A, this point corresponds to commit point B. To recover the EIP of the non-native instruction that is associated with the committed state at commit point B (the EIP of interest), the Here register 62 is read. The address in the Here register 62 points to VLIW B and hence also to pre-atom B. Pre-atom B includes pointer bits 114 that point to the EIP of interest (EIP(7)). EIP(7) in turns points to non-native instruction 7, which is the non-native instruction associated with commit point B.

While the above scenario involves a one-to-one mapping of commit point B and EIP(7), there are other scenarios in which this will not be the case. In these other scenarios, multiple commit points may be associated with a single EIP. These other scenarios are described in conjunction with FIGS. 3A–3C and 4A–4C. The example of FIG. 2A provides a relatively straightforward example of the features of the present invention in practice. The following examples will demonstrate how these features are advantageously utilized in more complex and challenging scenarios.

Figure 3A:
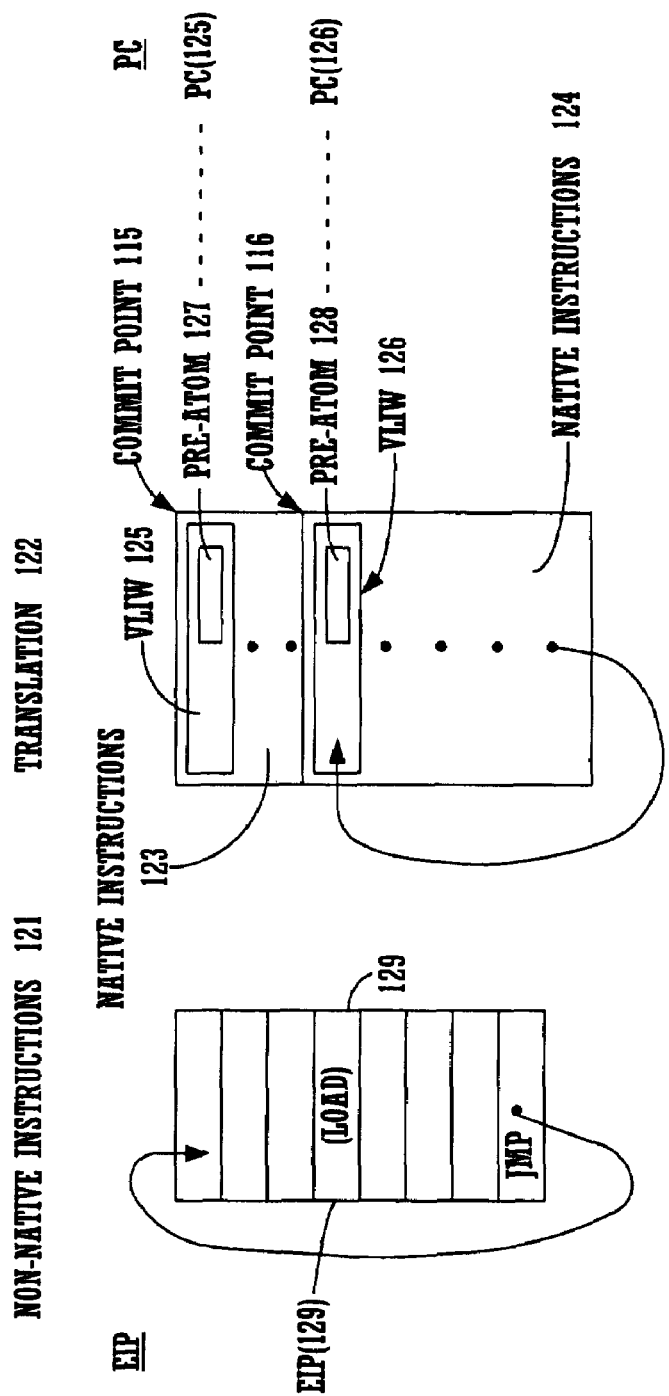
FIG. 3A illustrates another example of a translation of non-native instructions into native instructions according to one embodiment of the present invention.

FIG. 3A illustrates an example of a translation 122 of non-native instructions 121 into native instructions 123 and 124 according to one embodiment of the present invention. In this example, the non-native instructions 121 include a sequence of instructions that execute in a loop, including a "load" instruction 129 that is executed each time the loop is executed. In this example, the load instruction 129 loads data from the same memory location each time, and the memory location is not stored to as part of the loop. Importantly, each pass through the loop causes a commit operation to be performed.

Efficient translation of non-native instructions of this nature may be accomplished using two code sequences of native instructions. Native instructions 123 provide, in essence, a header portion of code that sets up the conditions of the loop. In other words, the code sequence of native instructions 123 performs the load prescribed by load instruction 129. Native instructions 124 execute the operations prescribed by the loop of non-native instructions. The native instructions 124 do not contain the load instruction 129, but use the value loaded by the native instructions 123. In this example, the code sequence of native instructions 124 also executes as a loop.

As translation 122 is entered, a first commit operation is performed to commit the state just prior to translation 122. The first instruction (molecule) in native instructions 123 is VLIW 125, which includes pre-atom 127. After the translated load operation is performed, execution proceeds to native instructions 124. The first instruction (molecule) in native instructions 124 is VLIW 126, which includes pre-atom 128. A program counter value PC(125) is associated with VLIW 125, and a program counter value PC(126) is associated with VLIW 126.

As mentioned above, a commit operation is performed each time a loop through native instructions 124 is completed. Thus, although two commit points are illustrated in FIG. 3A, there can be many commit points, depending on the number of times the loop of native instructions 124 is completed. As in the example of FIG. 2A, there are multiple commits associated with a single translation.

Figure 3B:
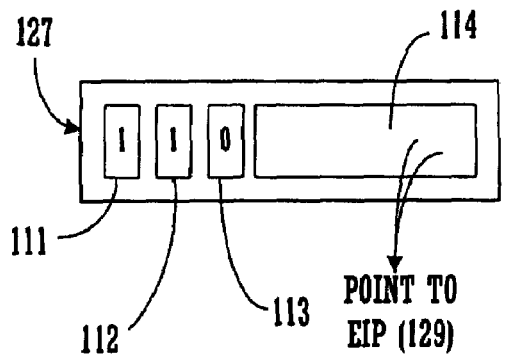
FIGS. 3B and 3C illustrate the contents of the instruction of FIG. 2B for the example of FIG. 3A, according to one embodiment of the present invention.

FIG. 3B illustrates the contents of pre-atom 127 included in VLIW 125, according to one embodiment of the present invention. It is appreciated that pre-atom 127 can include other information not shown. For the example of FIG. 3A, first bit 111 is set to 1 for the commit operation associated with commit point 116. This also places the program counter value for VLIW 125 (PC(125)) into the ACPC register 61. Second bit 112 is set to 1, and as a result PC(125) is also loaded into the Here register 62. The third bit 113 is set to 0, indicating that rollback compensation is not to be implemented. Accordingly, pointer bits 114 point to the EIP of interest. In the example of FIG. 3A, the EIP of interest is EIP(129).

Figure 3C:
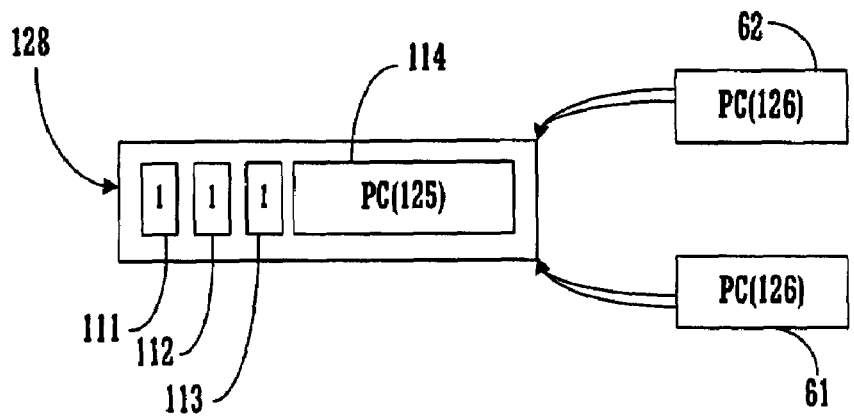

FIG. 3C illustrates the contents of pre-atom 128 included in VLIW 126, according to one embodiment of the present invention. It is appreciated that pre-atom 128 can include other information not shown. For the example of FIG. 3A, first bit 111 is set to 1 for the commit operation associated with commit point 116. This also places the program counter value for VLIW 126 (PC(126)) into the ACPC register 61, overwriting the program counter value that was placed there by pre-atom 127. Second bit 112 is set to 1, and as a result PC(126) is also loaded into the Here register 62, overwriting the program counter value that was placed there by pre-atom 127. The third bit 113 is set to 1, indicating that rollback compensation is to be implemented. The pointer bits 114 point to the program counter value corresponding to VLIW 125 (e.g., to PC(125)). As mentioned above, the pointer bits could instead point to a subroutine that implements rollback compensation.

The example of FIG. 3A is now used to describe the present embodiment of the present invention in practice. Consider a scenario in which an exception occurs during execution of the native instructions 124, in particular an exception that potentially affects the load operation accomplished by the native instructions 123. An example of such an exception is a direct memory access (DMA) interrupt in which an input/output device wants to read from or write to memory. As a result of the DMA, the memory location of the data loaded in the load operation (of instructions 123) might be changed.

Referring to FIG. 3C, in response to the DMA interrupt, Here register 62 is read. Here register 62 points to VLIW 126. In pre-atom 128 of VLIW 126, the rollback compensation bit (third bit 113) is set, and pointer bits 114 contain PC(125). As such, pointer bits 114 point to VLIW 125 so that instructions 123 can be executed. As part of the rollback compensation, PC(125) is loaded into Here register 62 and ACPC register 61. Now with reference to FIG. 3B, pre-atom 127 of VLIW 125 includes pointer bits 114 that point to EIP(129), the EIP of interest.

To summarize the above, with reference to FIG. 3A, rollback is to the latest commit point (commit point 116), but the translation is restarted at the first commit point of the translation (commit point 115). After rollback, the native state is the state committed at commit point 116, but the translation is restarted in a way such that the native instructions 123 are re-executed so that the load is performed again. Thus, translation 122 (FIG. 3A) is restarted at a consistent (architecturally precise) state after the exception is serviced, and the data of the load operation is reloaded before the loop is restarted.

In the example above, rollback compensation is implemented using a pointer to another pre-atom that points to the EIP of interest. As mentioned above, rollback compensation can instead be implemented using a subroutine. In the latter case, the pointer bits 114 of pre-atom 126 would point to the subroutine instead of to VLIW 125. Generally speaking, the subroutine performs functions performed by native instructions 123. Specifically, for the example of FIG. 3A, the subroutine reperforms the loads associated with native instructions 123 and sets the proper EIP. In this case, execution of translation 122 could begin at commit point 116.

The above-mentioned subroutine can also perform a more general cleanup of the native state. In particular, it is possible to arrange the native instructions 123 and 124 so that the native state that is committed at commit point 116 is not completely consistent. For example, some stores to memory that should have been completed may not have been completed. The aforementioned subroutine can perform those stores, thus making the native state consistent after a rollback operation.

Figure 4A:
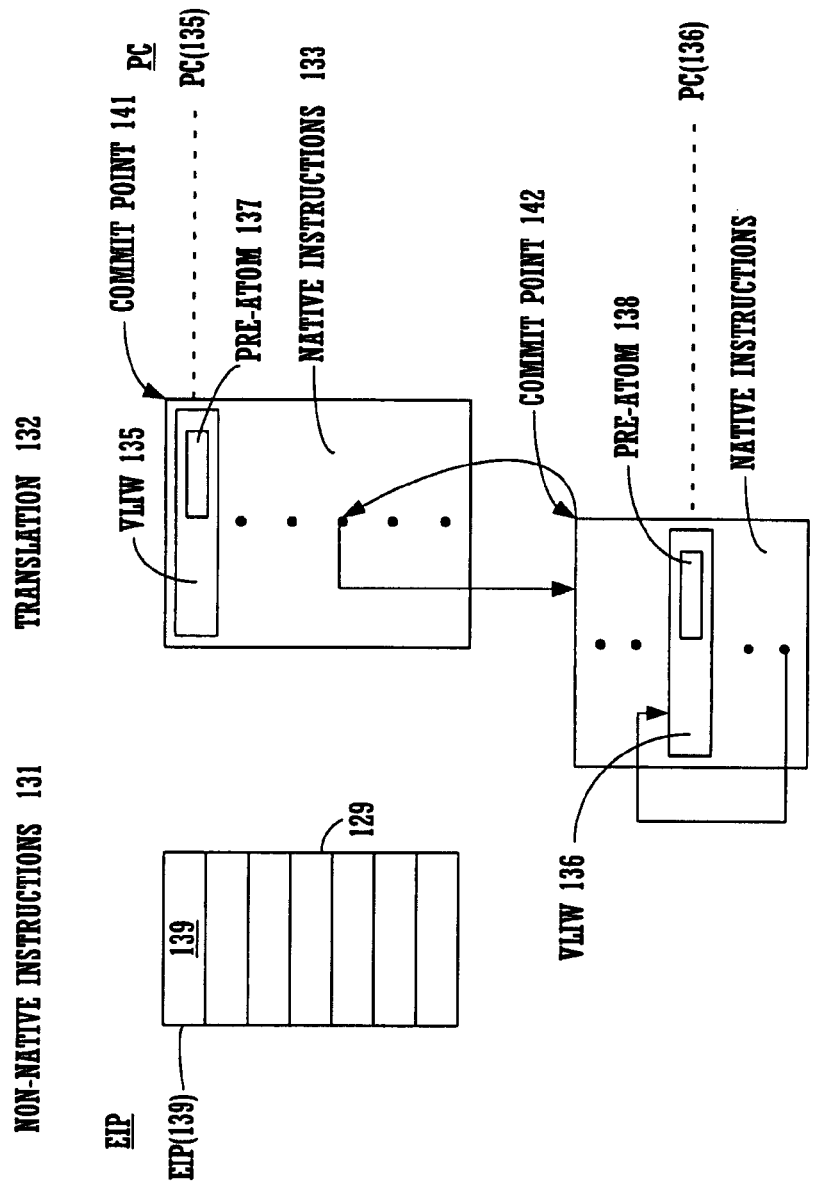
FIG. 4A illustrates yet another example of a translation of non-native instructions into native instructions according to one embodiment of the present invention.

FIG. 4A illustrates another example of a translation 132 of non-native instructions 131 into native instructions 133 according to one embodiment of the present invention. In this example, the native instructions execute a subroutine call for subroutine 140.

As translation 132 is entered, a first commit operation is performed to commit the state just prior to translation 132. The first instruction (molecule) in native instructions 133 is VLIW 135, which includes pre-atom 137. A program counter value PC(135) is associated with VLIW 135.

In the example of FIG. 4A, subroutine 140 executes native instructions in a loop. For example, subroutine 140 can execute a repetitive store instruction analogous to the REP STOS x86 instruction. A commit operation is performed each time a loop through subroutine 140 is completed. Thus, although two commit points are illustrated in FIG. 4A, there can be many commit points, depending on the number of times the loop of subroutine 140 is completed.

Although described for a subroutine that executes in a loop as an example, it is appreciated that there need not be a loop in the subroutine.

The first instruction (molecule) in subroutine 140 is VLIW 136, which includes pre-atom 138. It is important to note that native instructions other than native instructions 133 can execute a call for subroutine 140. Each of these other native instructions will have its own commit, and each will have its own distinct EIP.

Figure 4B:
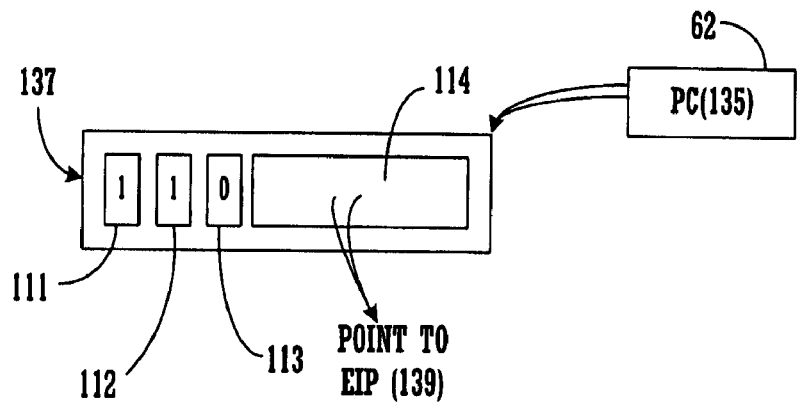
FIGS. 4B and 4C illustrate the contents of the instruction of FIG. 2B for the example of FIG. 4A, according to one embodiment of the present invention.

FIG. 4B illustrates the contents of pre-atom 137 included in VLIW 135, according to one embodiment of the present invention. It is appreciated that pre-atom 137 can include other information not shown. For the example of FIG. 4A, first bit 111 is set to 1 for the commit operation associated with commit point 141. This also places the program counter value for VLIW 135 (PC(135)) into the ACPC register 61. Second bit 112 is set to 1, and as a result PC(135) is also loaded into the Here register 62. The third bit 113 is set to 0, indicating that rollback compensation is not to be implemented. Accordingly, pointer bits 114 point to the EIP of interest. In the example of FIG. 4A, the EIP of interest is EIP(139).

Figure 4C:
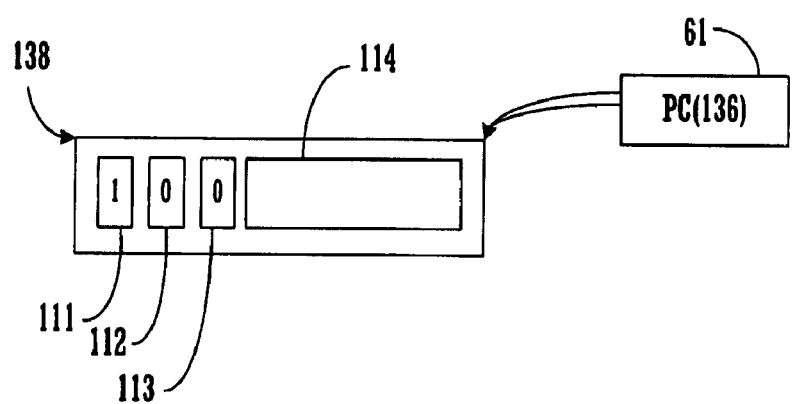

FIG. 4C illustrates the contents of pre-atom 138 included in VLIW 136, according to one embodiment of the present invention. It is appreciated that pre-atom 138 can include other information not shown. For the example of FIG. 4A, first bit 111 is set to 1 for the commit operation associated with commit point 142. This also places the program counter value for VLIW 136 (PC(136)) into the ACPC register 61, overwriting the program counter value that was placed there by pre-atom 137. Second bit 112 is set to 0, and as a result the Here register 62 is not changed; Here register 62 will continue to hold PC(135). The third bit 113 is set to 0, indicating that rollback compensation is not to be implemented. As a result, the pointer bits 114 are not set.

Thus, in the example of FIG. 4A, ACPC register 61 points to subroutine 140 (specifically, to VLIW 136), while Here register 62 points to VLIW 135. Consider a scenario in which an exception occurs during execution of subroutine 140. In response to the exception, Here register 62 is read. Here register 62 points to VLIW 135. Pre-atom 137 of VLIW 135 points to EIP(139), the EIP of interest. Thus, the present embodiment allows for multiple repetitive commits to occur while leaving the EIP of interest to point to the single instruction (e.g., REP STOS) that is the basis for the repetitive routine.

In summary, FIG. 2A shows a sequence of non-native instructions translated into multiple sequences of native instructions with multiple commit points, with a one-to-one mapping of commits to EIPs. FIG. 3A shows a sequence of non-native instructions translated into multiple sequences of native instructions with multiple commit points, with a many-to-one mapping of commits to EIPs. FIG. 4A shows a sequence of non-native instructions translated into a sequence of native instructions that call a subroutine, with a many-to-one mapping of commits to EIPs. The example of FIG. 4A is described as having a loop in the subroutine, but there does not need to be such a loop. In addition, the subroutine can be called by multiple callers, each having their own commit and a distinct EIP.

However, it is appreciated that the features of the present invention are not limited to the scenarios described herein. It is also appreciated that the various scenarios described by the examples of FIGS. 2A, 3A and 4A can be combined in various ways. In other words, the features of the present invention can be extended to even more complex scenarios based on combinations of the examples described herein.

For example, a sequence of native instructions in the example of FIG. 3A (e.g., native instructions 124) can call a subroutine as in the example of FIG. 4A. In such a scenario, the Here register 62 would point to VLIW 135 (FIG. 4A), and pre-atom 137 of VLIW 135 would point to EIP(129).

To summarize the examples of FIGS. 2A, 3A and 4A, a commit operation optionally sets a Here register 62 (FIG. 1B). A bit in a VLIW specifies whether the commit operation to occur, and another bit in that VLIW specifies whether the Here register 62 is set. Translations that include native instructions in a loop set the Here register 62, but subroutines with loops do not set it. In the latter case, the translation that calls the subroutine sets the Here register 62. In other words, commit operations in translations can cause the Here register 62 to be set, while commit operations in called subroutines do not. As such, it is possible to distinguish commits in translations from commits in called subroutines.

When set, the Here register 62 points to an EIP of interest (the EIP associated with the current translation). By using the Here register 62 instead of the ACPC register 61 (FIG. 1B) to recover the EIP of interest, there is a one-to-one mapping of translations to EIPs. In addition, by virtue of this one-to-one mapping, the Here register 62 provides the capability to identify to the translation software the translation that is currently executing.

Furthermore, the Here register 62 provides the mechanism for rollback compensation, so that a translation can be properly restarted after an exception (e.g., a DMA exception) is taken (e.g., when bit 113 is set). It is worth noting here that there are other causes and types of exceptions other than those described above. These include but are not limited to: an exception from an interrupt that occurs outside of the translation; exceptions that arise due to speculative scheduling of native instructions while translating non-native instructions; x86-based exceptions; and exceptions that may require that the translation be modified or replaced. The Here register 62 can also point to the data structures that are used to manage a translation, thus facilitating modification or replacement of a translation.

The use of Here register 62 offers yet another advantage. In one embodiment, a processor such as that exemplified by FIGS. 1A and 1B can run in one of a number of different modes. These modes can include, but are not limited to: a mode in which non-native instructions are fetched and interpreted one instruction at a time (this may be referred to as "terp" mode); a mode in which a saved translation is executed (this may be referred to as "trex" mode); a mode in which databases associated with translated instructions are updated or managed as opposed to executed (this may be referred to as "tcup" mode); and a mode in which the translation of non-native instructions to native instructions is performed (this may be referred to as "tran" mode). In such an embodiment, the Here register 62 can be used to determine the current mode of operation. For example, if the Here register 62 includes a pointer (e.g., an address for the EIP of interest), then it can be concluded that the processor is executing a translation and is thus in "trex" mode, because it is necessary to do EIP recovery only while executing a translation. If the Here register 62 is set to a small non-pointer value, then the processor is operating in another mode.

An advantage to the above scheme is that changing to a mode in which translations are executed (e.g., trex) from some other mode (e.g., tcup) is handled automatically by the commit at the start of the first executed translation. This commit sets the Here register 62 to a pointer value which indicates trex mode. Combining these actions is advantageous because it means that the EIP for the native instructions can always be recovered while in trex mode.

Figure 5:
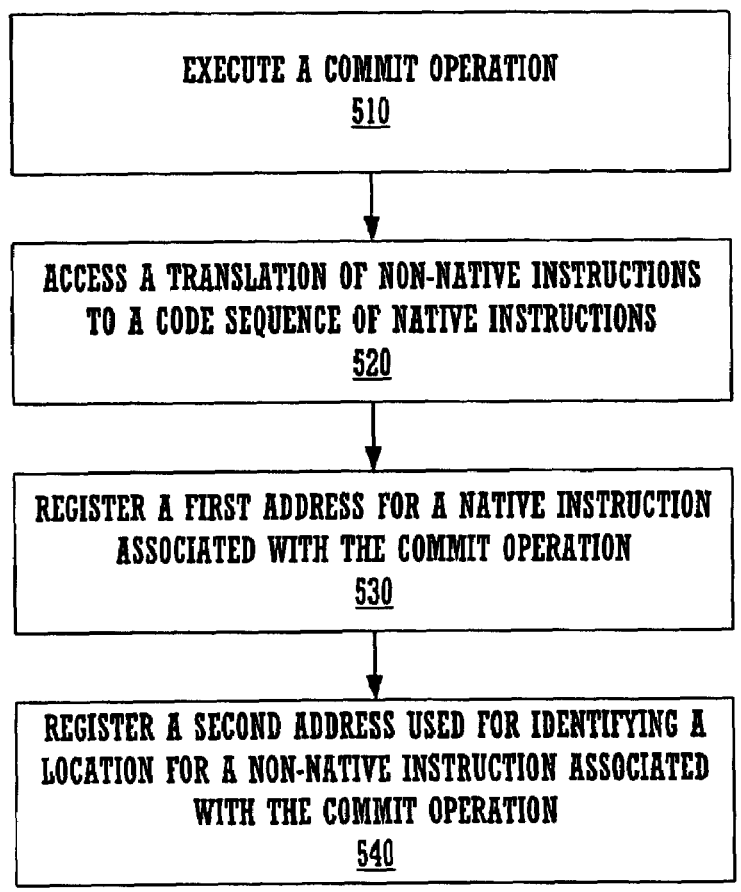
FIG. 5 is a flowchart of a process for registering information used for the recovery of the PC or IP for a target (non-native) instruction, according to one embodiment of the present invention.

FIG. 5 is a flowchart 500 of a process for registering information used for the recovery of the PC or IP for a target (non-native) instruction, according to one embodiment of the present invention. Although specific steps are disclosed in flowchart 500, such steps are exemplary. That is, embodiments of the present invention are well suited to performing various other steps or variations of the steps recited in flowchart 500. It is appreciated that the steps in flowchart 500 may be performed in an order different than presented, and that not all of the steps in flowchart 500 may be performed. In one embodiment, the method of flowchart 500 is implemented using a processor such as processor (microprocessor) 10 of FIG. 1A. In one such embodiment, the method of flowchart 500 is implemented as computer-readable instructions (e.g., translation or code morphing™ software 11 of FIG. 1A) stored in memory (e.g., ROM) that is coupled to, or integrated with, processor 10.

In step 510 of FIG. 5, in the present embodiment, a commit operation is executed.

In step 520, a code sequence of non-native instructions is translated into a code sequence of native instructions or an existing translation is accessed.

In step 530, a first address for a native instruction associated with the commit operation is placed into a first register. In one embodiment, this first register is register 61 of FIG. 1B, also referred to as the ACPC register.

In step 540 of FIG. 5, a second address used for identifying a location for a non-native instruction associated with the commit operation is placed in a second register. In other words, the second address allows the EIP for the non-native instruction to be recovered, either directly or indirectly. In one embodiment, this second register is register 62 of FIG. 1B, also referred to as the Here register, and the second address is placed in Here register 62 if the Here bit (e.g., bit 112 of FIG. 2B) is set. In one embodiment, the non-native instruction is associated with the commit operation in the sense that the target (non-native) processor state at the EIP of interest and the host (native) processor state at the commit point are consistent (architecturally precise). In another sense, the non-native instruction is associated with the commit operation in that the non-native instruction is the first instruction of the sequence of non-native instructions that is translated into the sequence of native instructions demarcated by the commit operation.

In some embodiments, the translation includes a first code sequence of native instructions that establishes conditions for a second code sequence of native instructions, and the first address and the second address each point to a native instruction in the second code sequence. In one of these embodiments, that native instruction in turn points to the EIP of interest. In another embodiment, that native instruction in turn points to a subroutine that provides the EIP of interest.

In other embodiments, the translation includes a first code sequence of native instructions that calls a second sequence of native instructions as a subroutine. The subroutine can also be called by code sequences other than the first code sequence. In one such embodiment, the first address points to a native instruction in the second code sequence, but the second address points to a native instruction in the first code sequence. The native instruction in the first code sequence in turn points to the EIP of interest.

FIG. 6 is a flowchart 600 of a process for recovering the EIP (e.g., the PC or IP) for a target (non-native) instruction, according to one embodiment of the present invention.

Although specific steps are disclosed in flowchart 600, such steps are exemplary. That is, embodiments of the present invention are well suited to performing various other steps or variations of the steps recited in flowchart 600. It is appreciated that the steps in flowchart 600 may be performed in an order different than presented, and that not all of the steps in flowchart 600 may be performed. In one embodiment, the method of flowchart 600 is implemented using a processor such as processor (microprocessor) 10 of FIG. 1A. In one such embodiment, the method of flowchart 500 is implemented as computer-readable instructions (e.g., translation or code morphing™ software 11 of FIG. 1A) stored in memory (e.g., ROM) that is coupled to, or integrated with, processor 10.

In step 610 of FIG. 6, in the present embodiment, a code sequence of native instructions is translated from a code sequence of non-native instructions or an existing translation is accessed.

In step 620, a rollback to a commit point is performed. A first address read from a first register is used to locate a native instruction associated with the commit point. In one embodiment, the first register is register 61 of FIG. 1B, also referred to as the ACPC register.

In step 630 of FIG. 6, in conjunction with the rollback, a second address is read from a second register. The second address is used to identify a location for a non-native instruction associated with the commit point. In other words, the second address is used to recover the EIP of interest. In one embodiment, the second register is register 62 of FIG. 1B, also referred to as the Here register. As described above, in one embodiment, the non-native instruction is associated with the commit operation in the sense that the target (non-native) processor state at the EIP of interest and the host (native) processor state at the commit point are consistent (architecturally precise). In another sense, the non-native instruction is associated with the commit operation in that the non-native instruction is the first instruction of the sequence of non-native instructions that is translated into the sequence of native instructions demarcated by the commit operation.

In some embodiments, the translation includes a first code sequence of native instructions that establishes conditions for a second code sequence of native instructions, and the first address and the second address each point to a native instruction in the second code sequence. In one of these embodiments, that native instruction in turn points to the EIP of interest. In another embodiment, that native instruction in turn points to a subroutine that provides the EIP of interest.

In other embodiments, the translation includes a first code sequence of native instructions that calls a second sequence of native instructions as a subroutine. In one such embodiment, the first address points to a native instruction in the second code sequence, but the second address points to a native instruction in the first code sequence. The native instruction in the first code sequence in turn points to the EIP of interest.

Figure 7:
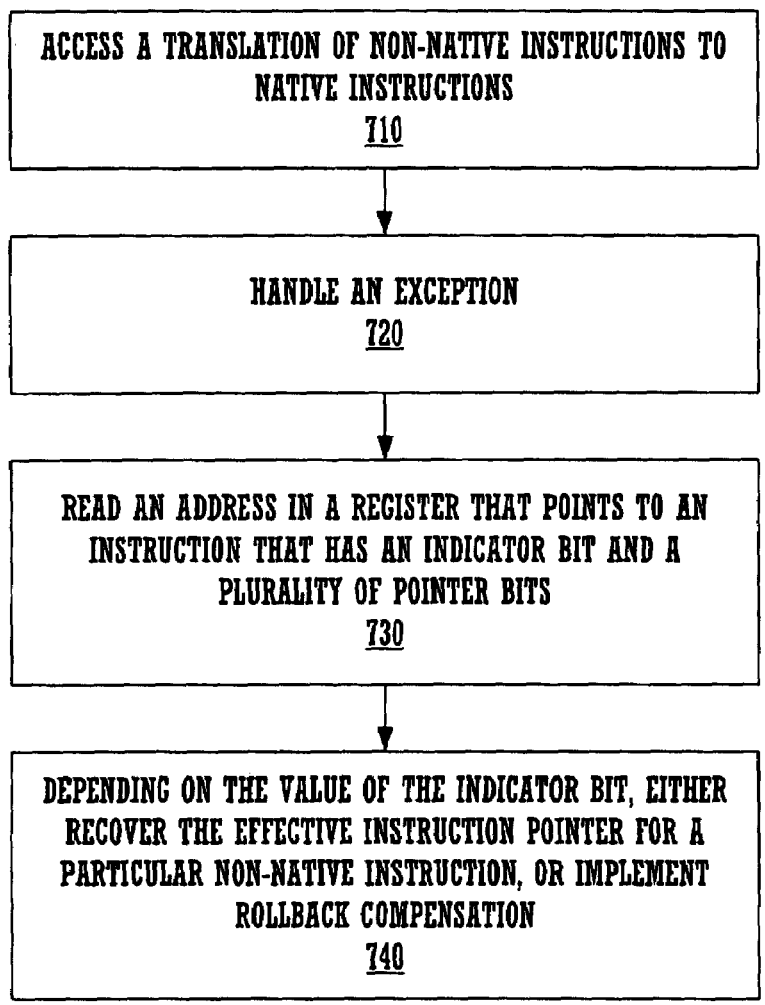
FIG. 7 is a flowchart of a process for recovering the PC or IP for a target (non-native) instruction, according to another embodiment of the present invention.

FIG. 7 is a flowchart 700 of a process for recovering the EIP (e.g., the PC or IP) for a target (non-native) instruction, according to another embodiment of the present invention. Although specific steps are disclosed in flowchart 700, such steps are exemplary. That is, embodiments of the present invention are well suited to performing various other steps or variations of the steps recited in flowchart 700. It is appreciated that the steps in flowchart 700 may be performed in an order different than presented, and that not all of the steps in flowchart 700 may be performed. In one embodiment, the method of flowchart 700 is implemented using a processor such as processor (microprocessor) 10 of FIG. 1A. In one such embodiment, the method of flowchart 500 is implemented as computer-readable instructions (e.g., translation or code morphing™ software 11 of FIG. 1A) stored in memory (e.g., ROM) that is coupled to, or integrated with, processor 10.

In step 710, in the present embodiment, a code sequence of native instructions is translated from a code sequence of non-native instructions or an existing translation is accessed.

In step 720, an exception is taken (handled). The exception can be a direct memory access interrupt, an exception from an interrupt that occurs outside of the translation, an exception that arises due to speculative scheduling of native instructions while translating non-native instructions, or an x86-based exception.

In step 730, when the exception is taken, an address in a register is read. In one embodiment, the address in the Here register 62 (FIG. 1B) is read. In such an embodiment, the address in the Here register 62 will point to one of the native instructions in the translation. As described above, that instruction will include a number of bits, including an indicator bit (e.g., third bit 113 of FIG. 2B) and a plurality of pointer bits (e.g., pointer bits 114 of FIG. 2B). In step 740, depending on the value of the indicator bit, the EIP of interest can be directly recovered or rollback compensation is implemented. In other words, depending on the value of the indicator bit, the pointer bits will point either to the EIP of interest, or to other information (e.g., another instruction or a subroutine) that can be used for recovering the EIP of interest.

In some embodiments, the translation includes a first code sequence of native instructions that establishes conditions for a second code sequence of native instructions, and the first address and the second address each point to a native instruction in the second code sequence. In one of these embodiments, that native instruction in turn points to the EIP of interest. In another embodiment, that native instruction in turn points to a subroutine that provides the EIP of interest.

In other embodiments, the translation includes a first code sequence of native instructions that calls a second sequence of native instructions as a subroutine. The subroutine can also be called by code sequences other than the first code sequence. In one such embodiment, the first address points to a native instruction in the second code sequence, but the second address points to a native instruction in the first code sequence. The native instruction in the first code sequence in turn points to the EIP of interest.

It is understood that the processes described by flowcharts 500, 600 and 700 (FIGS. 5, 6 and 7) can be combined in whole or in part.

In summary, embodiments of the present invention provide methods and systems that allow recovery of the EIP for a target (non-native) instruction that is translated into a host (native) instruction.

Embodiments of the present invention have been described. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of recovering a pointer to a non-native instruction, said method comprising:
    accessing a translation of a code sequence of non-native instructions to a code sequence of native instructions;
    executing multiple commit operations during execution of said code sequence of native instructions such that there are multiple commit points associated with said translation;
    registering a first address for a native instruction associated with the last occurring commit point of said commit points;
    registering a second address used for recovering a non-native instruction associated with the first occurring commit point of said commit points;
    performing a rollback operation to said last commit point; and
    restarting said translation at said first commit point.

2. The method of claim 1 wherein said first address and said second address each comprise a program counter value for said native instruction, wherein said native instruction comprises a pointer to the effective instruction pointer value for said non-native instruction.

3. The method of claim 1 wherein said executing and accessing further comprise:
    executing a first commit operation;
    accessing a first translation of non-native instructions to a first code sequence of native instructions, said first code sequence comprising a first native instruction associated with said first commit operation;
    executing a second commit operation; and
    accessing a second translation of non-native instructions to a second code sequence of native instructions, said second code sequence comprising a second native instruction associated with said second commit operation.

4. The method of claim 3 wherein said second code sequence of native instructions is executed in a loop, said first code sequence of native instructions establishing conditions for said loop, wherein said second commit operation is executed each time said loop is executed.

5. The method of claim 4 wherein said first address and said second address each comprise a program counter value for said second native instruction.

6. The method of claim 4 wherein said second native instruction comprises a pointer to said first native instruction, said first native instruction comprising a pointer to the effective instruction pointer value for said non-native instruction.

7. The method of claim 1 wherein said native instruction comprises a first bit, a second bit, a third bit, and a plurality of pointer bits, said first bit for causing said commit operation to be executed and a program counter value corresponding to said native instruction to be registered, said second bit for indicating whether said program counter value is to be registered, and depending on the value of said third bit, said pointer bits pointing to the effective instruction pointer for said non-native instruction or to another instruction that can be used for recovering said effective instruction pointer.

8. The method of claim 7 further comprising:
    using information in said plurality of pointer bits to identify a mode of operation associated with said translating.

9. The method of claim 1 further comprising:
    using said second address to identify a translation comprising said code sequence of native instructions.

10. A method of recovering a non-native instruction during execution of native instructions, said method comprising:
    accessing a translation of a code sequence of non-native instructions to a code sequence of native instructions, said code sequence of native instructions advancing from a first occurring commit point through multiple commit points to a last occurring commit point before a rollback operation;
    performing said rollback operation to return to said last commit point using a first address to locate a native instruction associated with said last commit point; and
    in conjunction with said rollback operation, using a second address to recover a non-native instruction associated with said first commit point to restart said translation.

11. The method of claim 10 wherein said code sequence of native instructions comprises a first code sequence of native instructions and a second code sequence of native instructions, said first code sequence demarcated by a first commit operation and comprising a first native instruction associated with said first commit operation, and said second code sequence demarcated by a second commit operation and comprising a second native instruction associated with said second commit operation.

12. The method of claim 11 wherein said second code sequence of native instructions is executed in a loop, said first code sequence of native instructions establishing conditions for said loop, wherein said second commit operation is executed each time said loop is executed.

13. The method of claim 12 wherein said first address and said second address each comprise a program counter value for said second native instruction.

14. The method of claim 12 wherein said rollback operation is prompted by an event that is external to said loop, said event potentially causing a change to said conditions.

15. The method of claim 14 wherein said event is a direct memory access operation.

16. A method of recovering a non-native instruction during execution of native instructions, said method comprising:
    accessing a translation of a code sequence of non-native instructions to a code sequence of native instructions, said translation producing multiple commit points when executed;
    taking an exception identified during execution of said translation;
    as a result of taking said exception, reading an address in a register, said address pointing to a native instruction having an indicator bit and a plurality of pointer bits, wherein depending on the value of said indicator bit, said pointer bits point either to a single effective instruction pointer for a non-native instruction associated with said multiple commit points or to information that can be used for recovering said effective instruction pointer.

17. The method of claim 16 wherein said information comprises another instruction that points to said effective instruction pointer.

18. The method of claim 16 wherein said information comprises a subroutine that provides said effective instruction pointer.

19. The method of claim 16 wherein said translation comprises a first code sequence of native instructions that establishes conditions for a second code sequence of native instructions that execute in a loop.

20. The method of claim 19 wherein said address points to an instruction within said second code sequence, said instruction within said second code sequence having pointer bits that point to an instruction within said first code sequence, said instruction within said first code sequence having pointer bits that point to said effective instruction pointer.

21. The method of claim 19 wherein said address points to an instruction within said second code sequence that has pointer bits that point to a subroutine that provides said effective instruction pointer.

22. The method of claim 16 wherein said translation comprises a first code sequence of native instructions that calls a second code sequence of native instructions as a subroutine, wherein said address points to an instruction within said first code sequence that has pointer bits that point to said effective instruction pointer.

* * * * *